G. M. WEINMAN.
Rubber Valves for Pumps.

No. 157,046. Patented Nov. 17, 1874.

UNITED STATES PATENT OFFICE.

GEORGE M. WEINMAN, OF COLUMBUS, OHIO.

IMPROVEMENT IN RUBBER VALVES FOR PUMPS.

Specification forming part of Letters Patent No. 157,046, dated November 17, 1874; application filed June 11, 1874.

*To all whom it may concern:*

Be it known that I, GEORGE M. WEINMAN, of Columbus, in the county of Franklin and State of Ohio, have invented a new and useful Improvement in India-Rubber Valves for Pumps; and I do hereby declare that the following is a full, clear, and exact description of the same, reference being had to the annexed drawings making part of this specification, in which—

Figure 1:
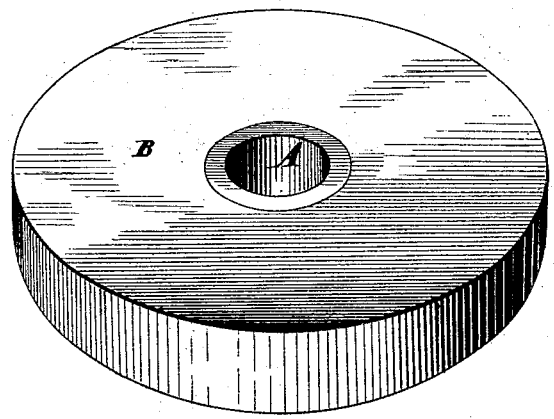
Figure 2:
Figure 3:
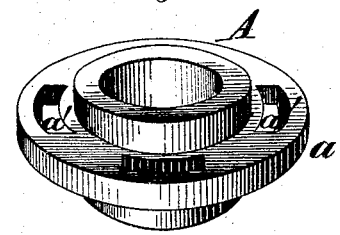

Figure 1 is a perspective view of a valve completed for use. Fig. 2 is a transverse section thereof, and Fig. 3 is a perspective view of the metallic center of the valve.

The same letters are employed in all the figures in the designation of identical parts.

This invention relates to that class of pump-valves which are made usually of a disk of india-rubber, having a round hole in the center, through which the valve-stem passes. In sliding on the stem the valve soon becomes worn so as to leak, and as it moves on the stem it wears irregularly, so that it soon loses its true motion, and, vibrating from side to side, rapidly cuts away the edges of the valve. This improvement corrects this defect, and, by giving to the valve a true motion on the stem, greatly increases its duration, while at the same time it leaves a rubber face on each side of the valve, so that when worn on one side it may be reversed, as heretofore. To this end this invention consists in constructing the valve with a solid metallic center, and a body of india-rubber, the former being bored to fit the valve-stem.

In the annexed drawings, A represents a metallic center, made of a non-corrosive composition, so that it will not be liable to rust fast on the valve-rod. This center is a tube, of size to be bored to fit the rod, having midway a flange, $a$, formed with slots $a'$, intended to receive the rubber as it is molded on the center, and hold it securely. B is the elastic disk of the valve, made of vulcanized india-rubber, or an equivalent elastic material of the proper diameter and thickness. This is molded on the center. As, in use, this center will prevent unequal and rapid wear, the proper action of the valve will be preserved for a long time, and there will be but little, if any, wear whatever on the face of the valve; but, if one side becomes worn to any extent, the valve may be reversed.

I am aware the metallic valves faced with india-rubber have been used, and I do not claim, broadly, for the union of the two materials in a valve. My invention relates only to that class of puppet-valves in which a disk-formed valve moves on a stationary valve-stem, and is confined to the special construction which, leaving the body of the valve to be constructed, as heretofore, of india-rubber, fits it with a metallic eye to prevent wear in that part which slides on the valve-stem.

What I claim as my invention, and desire to secure by Letters Patent, is—

In combination with the metallic flanged eye A, the molded india-rubber disk cast thereon, forming a flat cylindrical valve, substantially as set forth.

In testimony whereof I have signed my name to this specification in the presence of two subscribing witnesses.

GEORGE M. WEINMAN.

Witnesses:
- W. WILLSHIRE RILEY,
- R. B. SMITH.